United States Patent Office 3,240,680
Patented Mar. 15, 1966

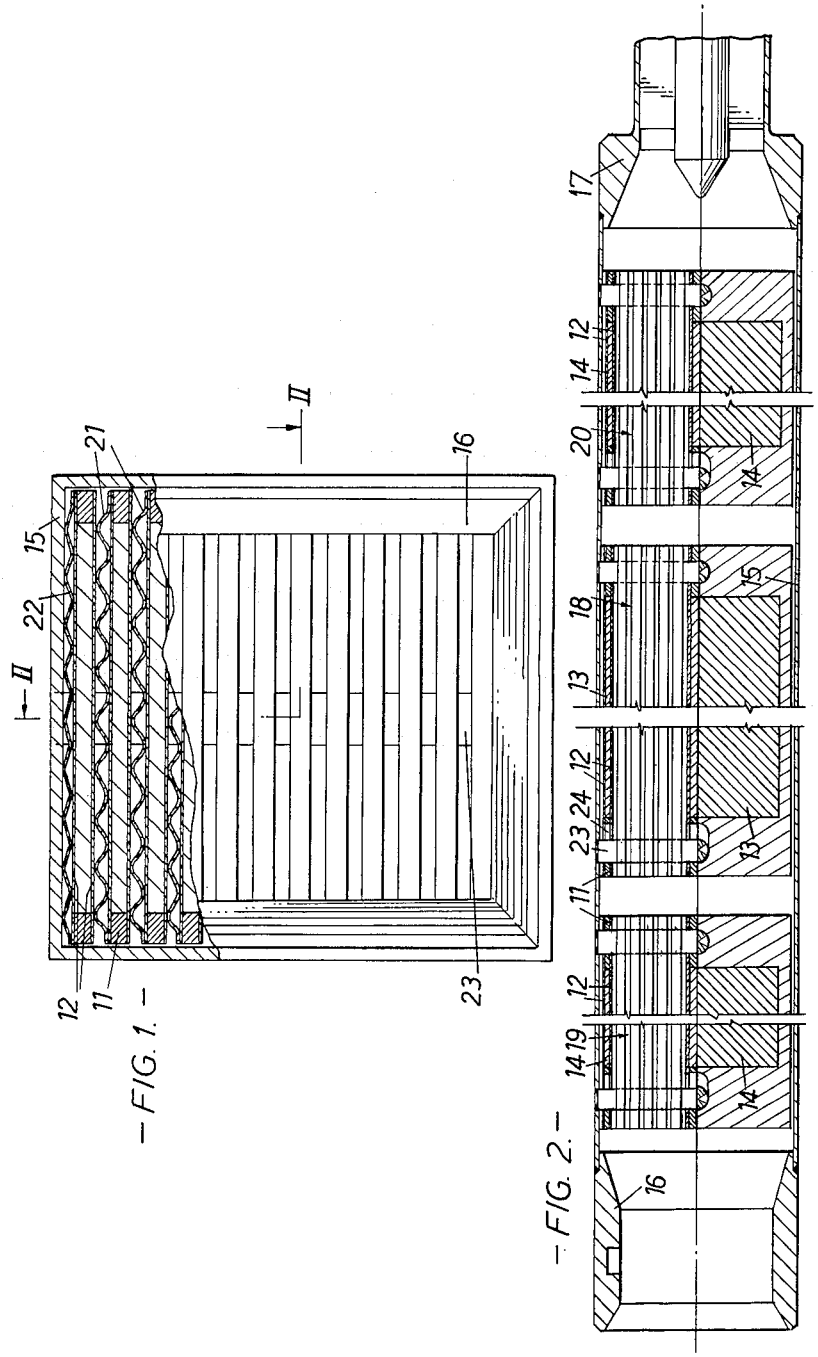

3,240,680
NUCLEAR REACTOR FUEL ASSEMBLIES
John Michael Laithwaite, Wilmslow, and Eric Watson, Culcheth, near Warrington, England, assignors to United Kingdom Atomic Energy Authority, London, England
Filed Dec. 31, 1962, Ser. No. 248,549
Claims priority, application Great Britain, Jan. 8, 1962, 739/62
2 Claims. (Cl. 176—75)

The present invention relates to fuel assemblies for heterogeneous nuclear reactors, and is concerned more particularly with assemblies of the plate type which have a plurality of parallel fuel plates which are spaced apart from one another.

According to the present invention, a nuclear reactor fuel assembly has an elongated tubular casing in which is fitted a pack of fuel plates which extend axially of the casing and are separated resiliently from one another and from the opposing casing walls. Resilient separation makes for a tight fit, free from rattles, of the plate pack in the casing; the assembly procedure is simplified in that attachment of the plate edges to the casing walls is omitted. In the past, such attachment has been a usual feature in assemblies of the plate type and commonly has involved the provision of grooves into which the plate edges are fitted. For establishing a rigid attachment of the plate edges, it has been preferred to make brazed joints since the many joints required in the assembly can be completed simultaneously using a flux dip brazing technique. Quite apart from the simplification resulting from the omission of this step, it is desirable to dispense with brazed joints because of the impurities that they can introduce into a reactor system.

More particularly, according to the present invention, a nuclear reactor fuel assembly has an elongated tubular casing in which is fitted a pack of fuel plates extending axially of the casing and resiliently compressed spacers between the fuel plates. Preferably the spacers are coextensive with the adjacent fuel plates and are so fashioned of sheet metal in corrugated form so as to abut alternately opposing plate faces whilst leaving open axially extending coolant flow paths between such faces. Spacers of this form can apply to a large area of the plates a pressure resisting bodily deformation and to some extent local swelling. Especially where the fuel assembly is to operate without a high pressure in the coolant passed over it, there is a tendency with clad fuel plates for the cladding to become detached from the fuel as a result of high internal pressure and/or inadequate bonding. Detachment of the cladding can lead to a serious restriction of the coolant flow channel between adjacent plates and in a fast reactor, which is a typical example of a reactor with low pressure coolant, the high heat rating of the fuel quickly causes such restriction to lead to overheating of the fuel. However, the spacers as previously set forth counteract this tendency and therefore enhance the utility of plate fuel for low pressure reactors.

With a liquid coolant, the curvature at the apices of the corrugations where contact is made with the plate faces should permit penetration of coolant into the contact angle. The curvature should therefore be chosen accordingly having regard to the nature of the coolant to be employed. This is especially so with a liquid metal coolant, such as sodium or an alloy of sodium with potassium, and in these circumstances it is estimated as a general guide that the pitch of the corrugations, that is to say, the spacing between the lines of contact with an adjacent face, should not be greater than seven times the separation between opposed faces of adjacent fuel plates.

The invention will be further described with reference to the particular embodiment which is illustrated by way of example in the accompanying drawings in which:

FIGURE 1 is in part a plan view and in part a cross section, and

FIGURE 2 is a section taken on the line II—II of FIGURE 1.

In the illustrated embodiment which is for use in a liquid metal cooled fast reactor, there are both fuel plates and breeder plates, both of which are clad by the method of inserting the fuel or breeder material, as the case may be, in a frame, laying cover plates over the top and the underside of the frame, and rolling the assembly thus formed to a desired reduced thickness. As shown the cladding constituted by the frame 11 and the cover plates 12 is of stainless steel, the fuel 13 is a cermet of mixed plutonium and uranium oxides dispersed in a stainless steel matrix, and the breeder material 14 is metallic uranium, possibly depleted in the fissile isotope.

A tubular casing 15 is also of stainless steel and at the upper end has a fitting 16 for engagement by a grab and at the lower end a hollow spike extension 17 (only partially shown) for locating the casing in the reactor core.

As best seen in FIGURE 2, a pack 18 of fuel plates is disposed within the casing between top and bottom packs 19 and 20 of breeder plates which are shorter in length, gaps being left between the separate packs. Interleaved between the plates of the packs 18 to 20 are spacers 21 (FIGURE 1) in the form of corrugated sheets of stainless steel which are co-extensive with the adjacent plates, the corrugations being arranged to run lengthwise of the casing so as to leave open between opposing faces of the plates flow paths extending from one end to the other of the casing. So that the flow area may not be sacrificed more than is necessary, the steel sheet of the spacers 21 is thin, for example 0.015 inch. These spacers are resilient in compression and each pack is inserted in the casing, together with similar spacers 22 interposed between the opposing casing walls and the outer plates of the pack, such that there is a slight degree of compression in the spacers and consequently the packs are a tight fit.

Location of the packs in the lengthwise direction of the casing is obtained by means of pins, such as 23, which are welded in apertures in the casing and pass through the packs perpendicular to the plates, there being in respect of each pack two pins disposed adjacent the ends. At one end the holes in the plates and spacers through which the respective pin passes are elongated in the lengthwise direction, as indicated at 24, so as to allow for lengthwise expansion of the plates.

Preferably the spacers 21 and 22 are attached at their side edges, as by welding, to one of the respectively adjacent plates. Consequently, the plates for the illustrated assembly each have an attached spacer component overlying one face; there will be spacer components attached over both the faces of one of the outer plates of each pack. The pitch of the corrugations in the spacers 21 and 22 ensures an angle large enough at the lines of contact with the plate faces for a sodium coolant to penetrate into the angle.

What we claim is:
1. A nuclear reactor fuel assembly comprising an elongated tubular casing, a pack of plain-faced clad fuel plates extending axially within said casing, unfueled sheet metal spacers, said spacers being generally coextensive with and interleaved between said plates and between the outer plates of said pack of plates and their respectively opposing casing walls, said spacers being corrugated to give lines of contact with said plates from one end of said pack to the other end of said pack, said spacers being resiliently compressible by virtue of the corrugations and being in a state of compression within said assembly to hold said pack of plates tightly in said casing, and when in said compressed state, the spacing of said lines of contact does not exceed seven times the distance of separation between the opposed faces of adjacent fuel plates.

2. As a composite article of manufacture, a plain-faced rectangularly-shaped clad nuclear fuel plate having overlaid on at least one face thereof a co-extensive unfueled spacer, said spacer being corrugated to give lines of contact with said plate extending continuously over said one face in substantially parallel relationship with the longer sides of said fuel plate, said spacer being of sheet metal thinner than the thickness of said plate for resiliently compressible engagement with an adjacent plain-faced surface, and wherein the attachment of said spacer to said plate pertains at the longer sides of said plate.

References Cited by the Examiner

UNITED STATES PATENTS

| | | | |
|---|---|---|---|
| 644,574 | 3/1900 | Braddock | 206—59 |
| 1,462,642 | 7/1923 | Karst et al. | 206—62 |
| 2,134,918 | 11/1938 | Hendley | 206—59 |
| 2,681,733 | 6/1954 | Welshenbach et al. | 206—62 |
| 2,936,273 | 5/1960 | Untermeyer | 60—108 |
| 2,988,495 | 6/1961 | Battle | 176—73 |
| 3,029,198 | 4/1962 | Anderson et al. | 176—75 |
| 3,070,534 | 12/1962 | Kooistra | 176—78 |
| 3,105,807 | 10/1963 | Blake | 176—79 |

REUBEN EPSTEIN, *Primary Examiner.*

CARL D. QUARFORTH, *Examiner.*